Figure 2A:
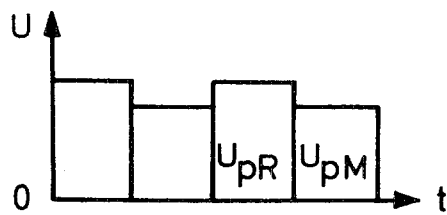
Figure 2B:
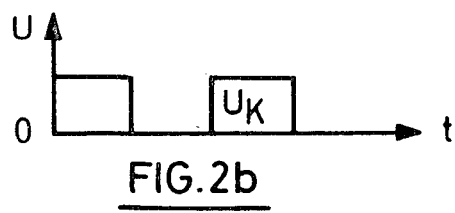
Figure 2C:
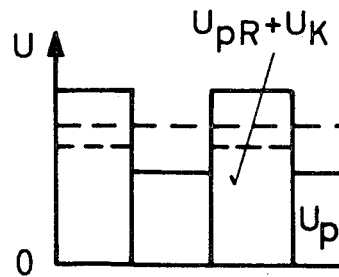
Figure 2D:
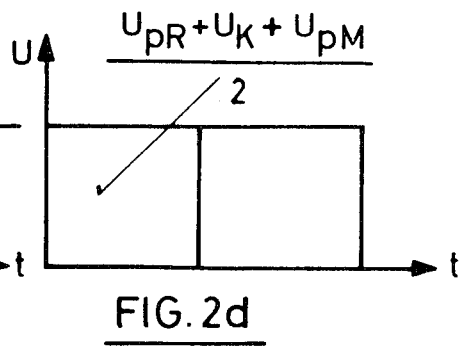
Figure 2E:
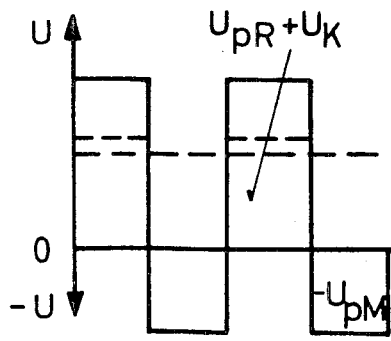

United States Patent [11] 3,623,817

[72] Inventor Tino Celio
Buchs, Zurich, Switzerland
[21] Appl. No. 13,650
[22] Filed Feb. 24, 1970
[45] Patented Nov. 30, 1971
[73] Assignee Ciba Limited
Basel, Switzerland

[54] COMPARISON DENSITOMETER INCLUDING MEANS TO MAINTAIN THE DETECTOR OUTPUT AT A MEANS VALVE
12 Claims, 11 Drawing Figs.

[52] U.S. Cl. .................................................. 356/179,
250/204, 250/220 SD, 250/233, 356/205, 356/212
[51] Int. Cl. .................................................. G01j 3/48,
G01n 21/22
[50] Field of Search .................................... 356/179,
205, 212; 250/204, 220 SD, 233

[56] References Cited
UNITED STATES PATENTS
3,467,475 9/1969 Celio et al. ........................ 356/179

Primary Examiner—Ronald L. Wibert
Assistant Examiner—Orville B. Chew, II
Attorney—Pierce, Scheffler & Parker ABSTRACT: This invention relates to a densitometer for measuring small differences in density. The densitometer comprises a light source providing a reference light beam for imaging on a reference object and a measuring light beam for imaging on an object whose density relative to that of the reference object is to be measured. Light reflected from the two objects is transmitted to a photodetector via an optical chopper that sequentially interrupts the transmitted beams. The photodetector produces sequential pairs of voltages which are applied to a logarithmic element in the form of a diode which produces pairs of logarithmic voltages for application to a polarity reverser which changes the polarity of one logarithmic voltage of a pair relative to the other voltage of the same pair. The voltages of each pair are then applied to an indicating instrument where they are utilized to give an indication of the difference in density between the two objects. The pairs of logarithmic voltages produced by the logarithmic element are also applied to a control circuit which controls either the intensity of the source or the amplification of the photodetector so that the voltages produced by the photodetector and applied to the logarithmic element are always within a predetermined range of amplitudes.

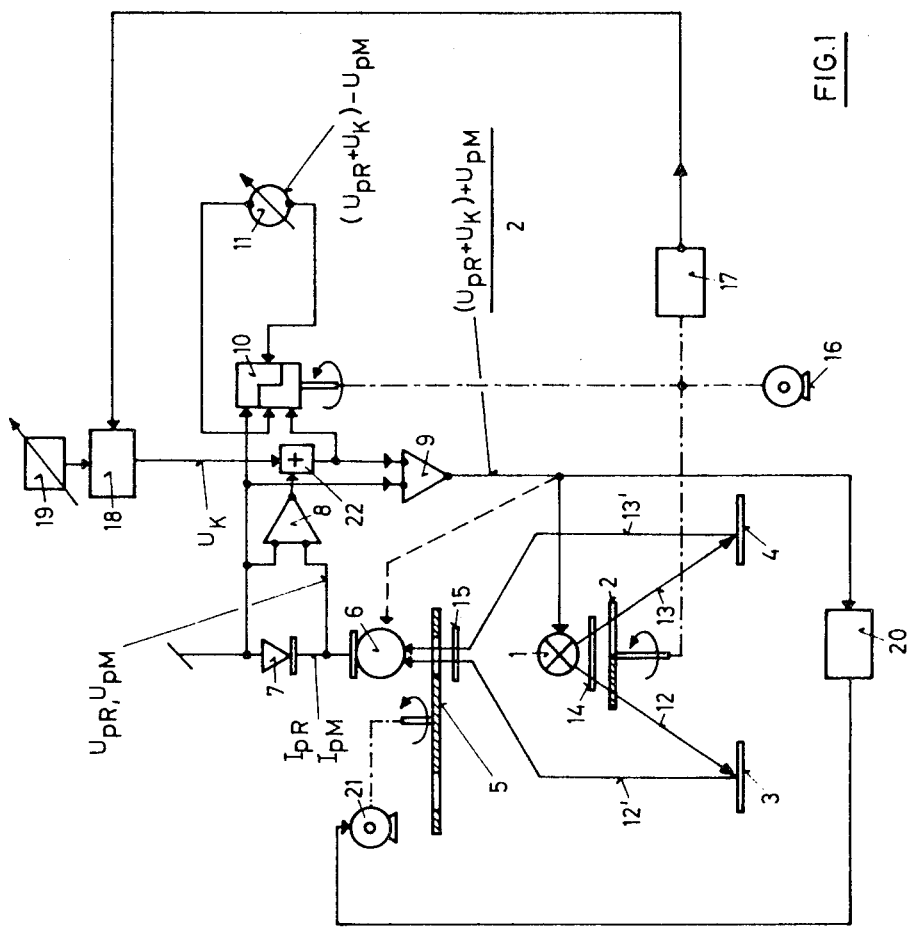

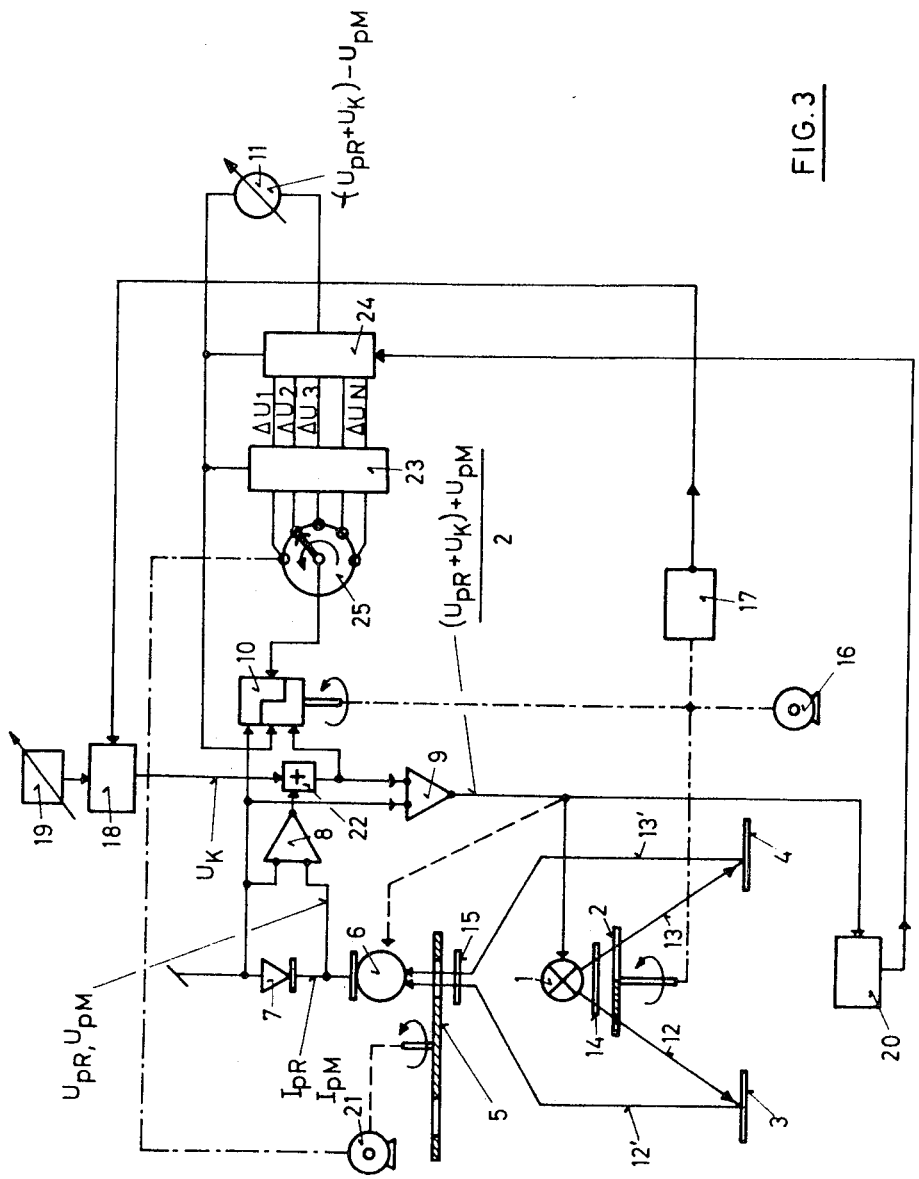

COMPARISON DENSITOMETER INCLUDING MEANS TO MAINTAIN THE DETECTOR OUTPUT AT A MEANS VALVE

This invention relates to densitometers.

One form of densitometer comprises a light source from which a measuring light beam and a reference light beam are derived and alternately guided to a photodetector via an object whose density is to be measured and an object having a known density respectively. The electrical output of the photodetector is applied to a logarithmic element to produce voltages which are hereinafter referred to as logarithmic photovoltages. These photovoltages are applied to a measuring instrument to indicate differences in density between the reference and measured objects.

In some known devices of this type, photocurrents of different magnitudes are produced by measurements on objects having widely different values of density resulting in the logarithmic element being operated over a wide range of its characteristic. The accuracy of measurement in the determination of small differences in density depends on the characteristic of the element being exactly logarithmic over the wide measurement range. Complicated circuit arrangements are necessary to compensate for temperature changes in the logarithmic element. Furthermore fatigue phenomena occur in the photodetector particularly as a result of fluctuations in the incident illumination and must be compensated, for example by complicated bridge circuits.

The invention seeks to obviate these disadvantages by utilizing a control circuit to control the brightness of the light source and/or the sensitivity or amplification factor of the photodetector in accordance with the logarithmic photovoltages produced in such a manner that the mean photocurrent corresponding to the mean brightness of the measuring and reference light beams is kept at least substantially constant for all measurements, so that the working point of the logarithmic element always lies within a predetermined range of the characteristic.

As a result of the combined use of the logarithmic element and of the control circuit, a system redundancy is obtained whereby the accuracy of measurement is increased and at the same time liability to faults is reduced. The invention also seeks to obviate the disadvantages of some known devices which are provided with a control circuit and do not use a logarithmic element, and in which the photocurrent produced in the photodetector is passed through an amplifier direct to an indicator instrument. The accuracy of measurement of difference in density with these devices is dependent on the extent to which it is possible to keep the mean photocurrent constant. If for example the photocurrent is kept constant to within 10 percent, an accuracy of 10 percent is necessarily also achieved for the difference in density measured. If great accuracy of measurement of differences in density is required, a great deal is asked of the circuit controlling the photocurrent, so that this circuit becomes expensive and difficult to produce.

An example of embodiment of the invention is explained in greater detail below with reference to the accompanying drawings, in which:

FIG. 1 is a block circuit diagram of a densitometer in accordance with this invention, FIG. 2a to 2f show pulse diagrams explaining the functioning of the densitometer illustrated in FIG. 1, FIG. 3 illustrates in the form of a block circuit diagram a modification of the densitometer shown in FIG. 1, and FIG. 4 to 6 illustrate different applications of the densitometer shown in FIG. 1.

In FIG. 1 two light beams 12 and 13 are derived from a source 1 and after passing through a polarization filter 14 are alternately masked by a rotating optical chopper 2 and projected onto an object 3 whose reflection density relative to the reflection density of a reference object 4 is to be measured. The light beams which are reflected by the objects 3 and 4, and which hereinbelow will be referred to as a measuring light beam 12' and a reference light beam 13' respectively, are passed sequentially to a photodetector 6 via a polarization filter 15, which serves to eliminate unwanted surface reflections from the two objects 3 and 4, and a rotary color filter disc 5, The photocurrents $I_{pR}$ and $I_{pM}$ respectively, produced by the photodetector 6, are fed to a logarithmic element 7, for example a logarithmic diode, which converts the currents $I_{pR}$ and $I_{pM}$ into corresponding logarithmic voltages $U_{pR}$ and $U_{pM}$. The logarithmic voltages $U_{pR}$ and $U_{pM}$ are amplified in an amplifier 8 and after passing through an adder 22 are fed to a servo amplifier 9 and to a polarity reverser 10. These amplified logarithmic photovoltages, which differ only by a proportionality factor from the logarithmic photovoltages produced in the logarithmic element 7, are referred to hereinbelow as logarithmic photovoltages $U_{pR}$ and $U_{pM}$. The output of the servoamplifier 9 is connected to a control voltage detector 20, whose output energizes a motor 21 for driving the colon filter disc 5. An indicator instrument 11 is connected to the polarity reverser 10, which is driven by a drive motor 16 synchronously with the optical chopper 2, and indicates through the action of the polarity reverser 10 the differences between the photovoltages of applied sequential pairs of logarithmic photovoltages of $U_{pR}$ and $U_{pM}$. A correction value circuit 19 for producing a correction voltage $U_K$ which is adjustable is connected to a second input of the adder 22 via a gate circuit 18 which operates in synchronism with the polarity reverser 10 by means of a timer 17.

Figure 2F:
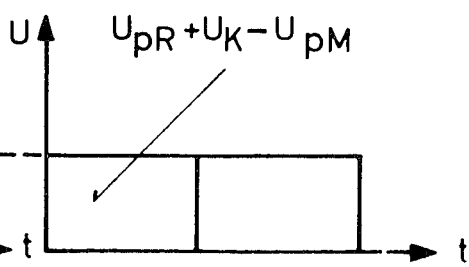

The densitometer operates as follows: at the input of the amplifier 8 the light reflected by the reference object 4 produces a logarithmic photovoltage $U_{pR}$ (reference voltage), and the light reflected by the object 3 to be measured likewise produces a logarithmic photovoltage $U_{pM}$ (measurement voltage) at the input of the amplifier 8. These voltages are amplified by the amplifier 8, so that voltages proportional to the logarithmic photovoltages $U_{pR}$ and $U_{pM}$ are produced in succession at its output as a result of the action of chopper 2. These amplified voltages are fed to the adder 22 together with the correction voltage $U_K$ for adding to the reference voltage $U_{pR}$. This is found necessary when, for example, deviations from the reference value of the reference object 4 and thus from the reference voltage $U_{pR}$ are required. In order that the correction voltage $U_K$ will not also be added to the measurement voltage $U_{pM}$ the gate circuit 18 is opened under the control of the timer 17 only during those intervals of time in which the reference object 4 is illuminated, that is to say when the reference voltage $U_{pR}$ is applied to the adder 22. It is also possible for a correction voltage $U_K$ to be added only to the measurement voltage $U_{pM}$. The adder 22 produces at its output sequential voltages $U_{pR}$ (or $U_{pM}$) $+U_K$ and $U_{pM}$ (or $U_{pR}$) which are applied to the polarity reverser 10 and to the servo amplifier 9. The polarity reverser 10 which is driven synchronously with the optical chopper 2 first applies the sum of the two voltages $U_{pR}+U_K$ to the indicator instrument 11, reverses polarity by turning through 180°, and then applies the voltage $U_{pM}$, with its polarity reversed in relation to the first voltage signal $U_{pR}+U_K$, to the indicator instrument 11, which has a time constant such that it indicates the difference between the two sequentially applied voltages, i.e., $U_{pR}+U_K-U_{pM}$. The photocurrents $I_{pR}$ and $I_{pM}$ produced in the photodetector 6 are directly proportional to the transmission or reflectance of the reference object and object to be measured respectively. These currents are converted in the logarithmic element 7 into logarithmic photovoltages $U_{pR}$ and $U_{pM}$ which are directly proportional to the logarithm of the photocurrent and thus to the transmission or reflectance of the reference object and object to be measured. Since, as is well known, the density value of an object is equal to the common logarithm of the reciprocal value of its transmission or reflectance, the voltage $U_{pR}+U_K-U_{pM}$ indicated by the indicator instrument 11 corresponds to the difference between the reflection densities of the reference object 4 and the measured object 3. The two voltages $U_{pR}+U_K$ and $U_{pM}$ are passed sequentially to the input of the servoamplifier 9. The time constant of the servoamplifier 9 is selected so that it is greater than the time taken for one rotation of the optical chopper 2, so that a voltage proportional to the sum of the two signals $U_{pR}+U_K+U_{pM}$ is produced at the output of the servoamplifier. Omitting proportionality factors, these different signals are illustrated in the pulse-time diagrams of FIGS. 2a to 2f. FIG. 2a shows the voltage pulses at the output of the amplifier 8, FIG. 2b the voltage pulses at the output of the gate circuit 18, FIG. 2c the voltage pulses at the outputs of the adder 22, FIG. 2d the voltage pulses at the output of the amplifier 9, FIG. 2e the voltage pulses at the input of the indicator instrument 11, and FIG. 2f shows the voltages indicated by the indicator instrument 11. The polarity and amplification of the servoamplifier 9 are selected so that in the circuit consisting of the light source 1, photodetector 6, logarithmic element 7, amplifier 8, adder 22, and servoamplifier 9 there is produced a regulation of such a type that through the control of the brightness of the light source 1 the beam photocurrent $(I_{pR}+I_{pM})/2$ produced by the photodetector 6 is kept substantially constant. Consequently, the working point of the logarithmic element is always situated approximately in the same position of its characteristic and the main logarithmic photovoltage $(U_{pR}+U_{pM})/2$ is also substantially constant.

The control circuit may also be arranged so that the servoamplifier 9 controls the amplification of the photodetector 6 instead of the brightness of the light source 1. This provides the advantage of far quicker control, but entails the disadvantage that the amounts of light reaching the photodetector 6 are not constant.

In the measurement of colored objects, a suitable color filter must be placed in front of the photodetector 6. In practice a suitable color filter is one for which the logarithmic photovoltages $U_{pR}$ and $U_{pM}$ have a maximum value with the same brightness of the light source 1. If the logarithmic photovoltages have a maximum value, the control voltage $(U_{pR}+U_K+U_{pM})/2$ occurring at the output of the amplifier 9 also has a maximum voltage. This can be utilized for automatic selection of a suitable color filter. For this purpose the filter disc (FIG. 1) is equipped with color filters which are interposed in the optical path one after the other by rotating the filter disc 5 in order to select the suitable filter. The filter disc 5 is rotated by a motor 21, which is controlled by the control voltage detector 20 connected to the servoamplifier 9. During the rotation of the filter disc 5 the control voltage detector 20 detects which filter causes the maximum control voltage to be produced. On completion of the rotation of the filter disc this filter is automatically positioned in the optical path by the control voltage detector 20 suitably energizing the motor 21.

FIG. 3 illustrates a variation of the last-mentioned measuring arrangement. Between the polarity reverser 10 and the indicator instrument 11 there are disposed a distributor 25, a store 23, and a gate circuit 24. The gate circuit 24 is connected to the output of the control voltage detector 20. The drive motor 21 for the filter disc 5 is not controlled by the control voltage detector 20 as in the case of FIG. 1, but runs in synchronism with the distributor 25. In order to determine which color filter will produce the maximum control voltage, all $n$ filters are sequentially interposed in the optical path by rotating the filter disc 5. As each filter is interposed in he optical path sequential reference and measurement voltage pairs are applied by the polarity reverser 10 to the distributor 25, which feeds these voltage pairs into $n$ different channels of the store 23, where they are stored. The control voltage detector 20 detects which filter produces the maximum control voltage and on completion of the rotation of the filter wheel causes the gate circuit 24 to pass on to the indicator instrument 11 the pair of reference and measurement voltages produced by a filter which caused the maximum control voltage to be produced. Since the $n$ pairs of voltages produced by the $n$ different filters are simultaneously available at the output of the store 23, this arrangement can also be used as a multichannel measuring instrument, in which $n$ different voltage pairs are indicated simultaneously by $n$ indicator instruments.

Figure 4:
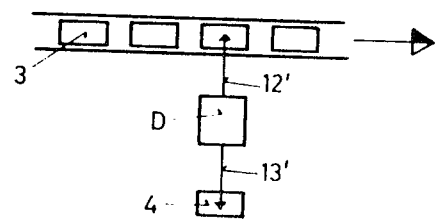

In FIG. 4, the densitometer is used to make color density measurements on a continuously moving object 3, for example a web of paper or tiles carried on a conveyor belt. The standard value of density of the object 4 to be maintained is placed under the reference light beam 13' and the differential densitometer D measures the density of the goods 3 moving past the measuring light beam 12' relative to the density of the object 4. If predetermined tolerances for the measured density are exceeded, switches can be operated by means of the signal produced by, for example, the measuring instrument shown in FIGS. 1 and 3 or rejection marks made on the object 3. If corrections to the standard value 4 are desired without having to replace it, these can be made with the aid of the correction circuit 19 shown in FIG. 1.

Figure 5:
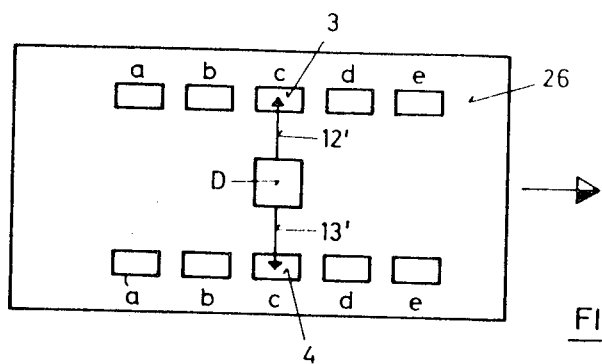

In the example illustrated in FIG. 5, the position of the reference object 4 and the object 3 to be measured vary together in synchronism, as is the case for example in the checking of color scales in offset printing. At the edge of the sheet to be monitored, control areas $a$, $b$, $c$, $d$, and $e$ are provided which are sequentially moved under the measuring light beam 12', while a similar scale serving as a standard moves under the reference light beam 13'. When the measurement table 26 on which lie the sheet and the standard scale is moved, the measured and reference objects 3 and 4 move past the corresponding light beams 12' and 13', the densitometer D indicating in succession any differences in density which occur. Here again, the correction values $(U_K)$ can be introduced in the manner described above.

Figure 6:
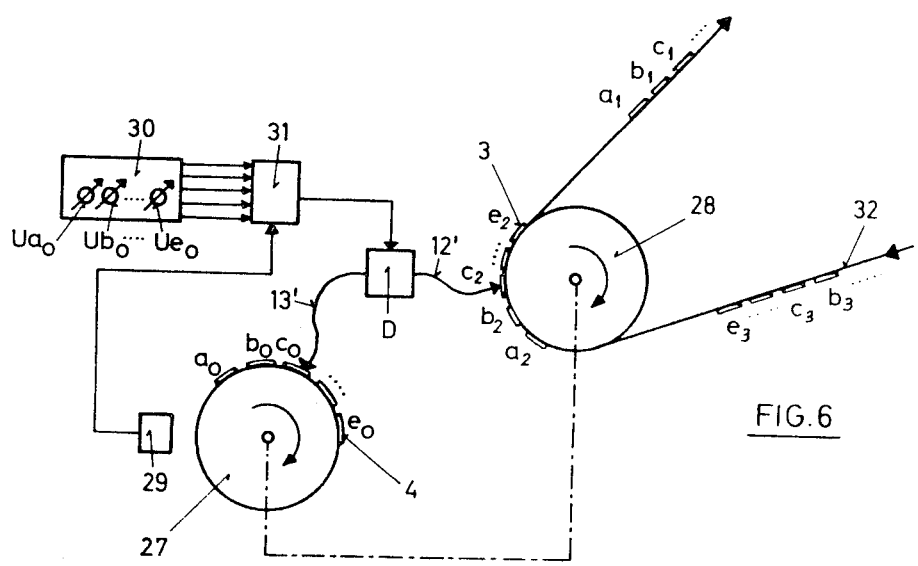

In the example illustrated in FIG. 6, in which the position of measured and reference objects likewise vary in synchronism, the measured and reference objects 3 and 4 are not disposed on a common table, but on cylinders 28 and 27, as is the case for example in rotary printing. The printed paper web 32 having color bars $a$, $b$, $c$ and $e$ is placed around the cylinder 28 and a density measurement made with the measuring beam 12'. Simultaneously the standard sample 4 having color bars $a_o$, $b_o$, $c_o$ and $e_o$ is stretched over a cylinder 27 rotating synchronously with the cylinder 28. The cylinder 27 may either be a part of the cylinder 28 or be spacially separate therefrom. The color bars of the standard 4 are repeated cyclically and in synchronism with the corresponding color bars 3 travelling over the cylinder 28. In order to introduce correction values, the position of the various standard samples $a_o$, $b_o$, $c_o$, $d_o$, $e_o$ is detected with the aid of a detector 29 and transmitted to a gate circuit 31 in such a manner that the latter transmits to the gate circuit 18 in the differential densitometer D shown in detail in FIGS. 1 or 3, the correction value for each of the standard samples stored in the store 30 in the form of voltages $U_{a_o}$ to $U_{e_o}$. The correction circuit 19 included in the apparatus shown in FIG. 1 is here superfluous, since the gate circuit 31 and store 30 takes over its function. If the correction is not to be made for individual color samples, but is to act to generally increase the amount of ink printed or vary color saturation, circuits known from television and scanner techniques may be used advantageously.

The advantage of the apparatus described consists above all in the system redundancy achieved by the use of a logarithmic element and a control circuit. If a logarithmic element is used alone without controlling the intensity of the light source or the output from the photodetector, that is to say without keeping the output photocurrent constant, the logarithmic element must be exactly logarithmic over a wide range, and temperature fluctuations must be eliminated or compensated. If on the other hand only a control circuit is used without using a logarithmic element and if the photodetector is connected direct to the indicator instrument through an amplifier, the problem of keeping the photocurrent constant arises. Any fluctuation of the mean photocurrent entails an equally great fluctuation of the result of the measurement. In the apparatus described herein on the other hand the photocurrent does not need to be maintained constant to any high degree of accuracy, because the logarithmic element is always operated approximately at the same point of an accurately logarithmic region of its characteristic by means of the control circuit. As is well known, in such a region the resistance of the logarithmic element varies in inverse proportion to the current, whereby the logarithmic photovoltage has the product of current and resistance remains constant. Since through the control operation not only the mean photocurrent $(I_{pR}+I_{pM})/2$ but also the mean logarithmic photovoltage $(U_{pR}+U_{pM})/2$ is kept substantially constant and instability of the photodetector in consequence of temperature fluctuations is automatically eliminated. Temperature fluctuations in the logarithmic element are likewise compensated by the control circuit. In addition, the amplifier 8 need be composed only a simple circuitry since it has to handle only a small working range of voltages.

What is claimed is:

1. A densitometer comprising a light source, means for directing a reference and a measuring light beam from said source alternately onto a reference object having a predetermined density and an object whose density is to be measured relative to the density of the reference object respectively, photodetector means receiving light transmitted from said reference and measuring objects and producing in response thereto output signals representative of the intensity of the transmitted light, a logarithmic element responsive to the signals provided by said photodetector means for providing signals whose magnitudes vary logarithmically with variations in intensity of the light transmitted to said photodetector means, and a control circuit responsive to the signals provided by said logarithmic element to maintain the signals produced by said photodetector means at substantially a mean value corresponding to the mean intensity of the light transmitted to said photodetector from said reference and measured objects so that the logarithmic element works substantially within a predetermined range of magnitudes of the signals applied thereto.

2. A densitometer according to claim 1 including means varying the intensity of said source and coupled to said control circuit to maintain the signals produced by said photodetector means substantially at said mean value.

3. A densitometer according to claim 1 including means varying the amplification of said photodetector means and coupled to said control circuit to maintain the signals produced by said photodetector means substantially at said mean value.

4. A densitometer according to claim 1 including an optical chopper sequentially interrupting said reference and measuring light beams causing said logarithmic element to produce pairs of sequential signals representing the intensity of the light transmitted to said photodetector means from said reference object and measuring object.

5. A densitometer according to claim 1 including an optical chopper sequentially interrupting said reference and measuring light beams, a polarity reverser coupled to the output from said logarithmic element and synchronously operable with said optical chopper so that the signal produced by said photodetector means on one of said beams being transmitted thereto is reversed in polarity relative to the signal produced by said photodetector means on the other of said beams being transmitted thereto, and an indicating instrument coupled to said polarity reverser to provide an indication of the difference between the density of said object and said reference object.

6. A densitometer according to claim 5 including a value correction circuit producing a value correction signal whose amplitude is adjustable, a gate circuit coupled to said value correction circuit, and an adder circuit having one input coupled to the output of said gate circuit, another input coupled to the output of said logarithmic element and an output coupled to said polarity reverser and said control circuit, and means operable in synchronism with said optical chopper and polarity reverser opening said gate circuit to allow a correction value signal to be added by said adder circuit to one of the signals produced by the logarithmic element when one of said light beams is transmitted to said photodetector means.

7. A densitometer according to claim 1 including a plurality of different color filters, and means for interposing said filters successively in the path of said light beams, and in which said control circuit includes a control voltage detector detecting the maximum voltage produced by said logarithmic element as each of said different color filters are interposed in both said paths, said densitometer further including automatic control means responsive to the operation of said control voltage detector to position in the paths of said light beams the filter producing said maximum voltage.

8. A densitometer according to claim 4 including a disc having a plurality of different color filters disposed radially thereon, a store, a distributor, drive means rotating said disc and driving said distributor, said distributor distributing to said store pairs of signals produced by said logarithmic element as each filter is interposed in both said light beam paths and both said light beams are interrupted by said optical chopper, and wherein said control circuit includes a control voltage detector detecting the maximum mean voltage of each pair of voltages produced by the logarithmic element as each disc is interposed in both said light beam paths and said light beams are interrupted by said optical chopper, and a gating circuit responsive to said maximum voltage for gating out of said store the pair of voltages producing said maximum means voltage.

9. A densitometer according to claim 4 including a disc having a plurality of different color filters disposed radially thereon, a store having $n$ storage locations, a distributor, drive means rotating said disc and driving said distributor, said distributor distributing to the $n$ storage locations pairs of signals produced by said logarithmic element as each filter is interposed in both said light beam paths and $n$ indicating instruments each coupled to a different one of said $n$ storage locations to indicate the difference in density between the reference object and the measuring object as represented by the difference in magnitude between the reference object signals of a pair when a filter of said plurality is interposed in said light beam paths.

10. A densitometer comprising a light source, means for directing a reference and a measuring light beam from said source onto a reference object having a predetermined density and an object whose density is to be measured relative to the density of the reference object respectively, photodetector means receiving light transmitted from said reference and measuring objects and producing signals representing the density of the reference and measuring objects, an optical chopper for sequentially interrupting said beams so that said photodetector means produces pairs of sequential pulses representing the density of the reference and measuring objects, a logarithmic element responsive to the signals produced by said photodetector means for providing signals whose magnitudes vary logarithmically with variations in the intensity of the light transmitted to said photodetector means, a polarity reverser coupled to the output of said logarithmic element and synchronously operable with said optical chopper so that a signal of a pair produced by said photodetector means on one of said beams being transmitted thereto is reversed in polarity relative to the other signal of the same pair produced by said photodetector means on the other of said beams being transmitted thereto, and a control circuit responsive to the pairs of signals provided by said logarithmic element to maintain the pairs of signals produced by said photodetector means at substantially a mean value corresponding to the mean intensity of the light transmitted to said photodetector means so that the logarithmic element works substantially within a predetermined range of magnitude of the signals applied thereto.

11. A densitometer according to claim 10 including means varying the intensity of said source and coupled to said control circuit to maintain the signals produced by said photodetector means substantially at said mean value.

12. A densitometer according to claim 10 including means varying the amplification of said photodetector means and coupled to said control circuit to maintain the signals produced by said photodetector means substantially at said mean value.

UNITED STATES PATENT OFFICE
CERTIFICATE OF CORRECTION

Patent No. 3,623,817            Dated November 30, 1971

Inventor(s) Tino Celio

It is certified that error appears in the above-identified patent and that said Letters Patent are hereby corrected as shown below:

Change the title and heading preceding Column 1 of the specification to read:

-- Comparison Densitometer Including Means To Maintain The Detector Output At A Mean Value --

Signed and sealed this 30th day of May 1972.

(SEAL)
Attest:

EDWARD M. FLETCHER, JR.
Attesting Officer

ROBERT GOTTSCHALK
Commissioner of Patents